Patented May 12, 1942

2,282,827

UNITED STATES PATENT OFFICE 2,282,827

RESINOUS PRODUCT AND METHOD OF MAKING

Henry S. Rothrock, Wilmington, Del., assignor to E. I. du Pont de Nemours & Company, Wilmington, Del., a corporation of Delaware No Drawing. Application November 13, 1939, Serial No. 304,265

22 Claims. (Cl. 260—22)

This invention relates to improved polyhydric alcohol-polycarboxylic acid resins, and more particularly to coating and molding compositions based thereon. Such resins are hereinafter referred to for brevity as alkyd resins.

In order to bake drying oil modified alkyd resins to the degree of hardness desired for many purposes, baking schedules which are undesirably long and involve undesirably high temperatures must usually be used. Non-drying oil modified alkyd resins generally cannot be hardened at all, even on prolonged baking at high temperatures. In the field of molding, alkyd resins have met with little success because of frequently poor water-resistance and mechanical defects, such as fragility.

An object of the present invention is to treat those alkyd resins which "dry" (i. e., can be converted to films) in such manner as to cause them to dry faster. Another object is to confer drying properties upon those types of alkyd resins which ordinarily do not set up to films. General objects are the preparation of alkyd resins of improved properties, and the preparation of improved coating and molding compositions. Other objects will appear hereinafter.

These objects are accomplished by the following invention wherein an alkyd resin, preferably one which is organic-solvent-soluble (i. e., soluble in some organic solvent and not necessarily in all organic solvents) is treated with a polyisocyanate or a polyisothiocyanate, i. e., a compound having a plurality of groups of the formula —NCX, X being a group VI element of atomic weight less than 33, i. e., oxygen or sulfur. The products are alkyd resins containing in chemical combination the reaction residue of the poly —NCX compound.

In a preferred embodiment of the invention, a small amount of a diisocyanate or diisothiocyanate is added to, and mixed well with, a substantially anhydrous pigmented or unpigmented solution of the alkyd resin in an organic solvent. The amount giving best results will vary with the type of resin and is explained more fully hereinafter. The mixing may or may not be accompanied by heating, depending upon the degree of condensation of the resin and upon the type of resin, both of which are also explained further in and following the examples. The treatment with the poly —NCX modifier is desirably accompanied or followed by treatment with a small amount of a soluble metallic drier, such as cobalt linoleate or naphthenate. After addition of the modifier, films are laid down on the surface to be coated by air-drying at ordinary or elevated temperatures, preferably the latter.

Films obtained by air-drying or baking alkyd resins treated as above are characterized by a rapid set-up, improved hardness, greater durability on exposure to the elements, and a decreased tendency to wrinkle. The latter property makes possible the use of higher proportions of drier and a higher solids content than is normally feasible, whereby hard thick films can be laid down in a single coating operation.

The more detailed practice of the invention is illustrated by the following examples, wherein parts given are by weight. Example I shows the treatment of an enamel based upon a mixture of completely preformed drying oil modified alkyd resins; Example II shows the treatment of an unpigmented solution of the same resin mixture; Example III illustrates the treatment of an alkyd resin made with excess polyhydric alcohol, a type of resin specially prepared to provide additional foci or points of reaction; Example IV shows the treatment of a mixed glycerol-glycol alkyd resin, a type with which larger amount of the agent are ordinarily used; Example V shows treatment of an alkyd resin with a diisothiocyanate; Examples VI and VII show use of diisocyanates different from that of Examples I–V; Examples VIII and IX show treatment of semi-drying oil modified alkyd resins; Examples X, XI and XII demonstrate the effect of a diisocyanate on non-drying oil modified alkyd resins; and Examples XIII–XVI show treatment of unmodified alkyd resins. Examples XV and XVI also show preparation of molding compositions. There are of course many forms of the invention other than these specific embodiments.

Example I

An alkyd resin enamel is prepared from a pigment consisting of a 1:1 mixture of titanium oxide and antimony oxide, and a vehicle consisting of a hydrocarbon solvent solution of a 1:2 mixture of a linseed oil modified alkyd resin and a mixed China-wood oil-linseed oil modified alkyd resin (both resins containing approximately 50% oil). The ratio of pigment to binder is approximately 1 to 1, and the solids content of the enamel is 55%. To 214 parts of this enamel are added 3 parts of hexamethylene diisocyanate (5% based on the vehicle) and 0.16 part of a 2% solution of cobalt naphthenate in a hydrocarbon solvent (0.01% cobalt based on the oil in the vehicle) and the mixture stirred well for a few minutes. The resulting enamel when applied over bare steel and over steel having an alkyd enamel primer, and then baked for one-half hour at 82° C., sets up to a finish which is hard, tough, water-resistant, perfectly smooth, and has excellent outdoor durability in that the film after 22 weeks and longer still has a fair gloss, has not blistered, and has prevented rusting of the steel. In comparison, an enamel which is exactly identical except for the diisocyanate treatment yields a wrinkled film which on exposure has lower gloss and shows some blistering over plain steel.

Example II

To 750 parts of a 52% hydrocarbon solvent solution of the alkyd resin mixture used in Example I are added 20 parts of hexamethylene diisocyanate and 1 part of a 2% solution of cobalt naphthenate in a hydrocrabon solvent (0.01% cobalt based on the oil in the alkyd resins). After the mixture has been thoroughly stirred for a few minutes, this clear coating composition is ready for application. Films laid down over plain steel and over steel having an alkyd resin primer, and baked for one-half hour at 82° C., are very hard, smooth, tough, water-resistant, and exhibit excellent outdoor behavior in that after 22 weeks and longer the film is glossy, intact, and has prevented rusting completely. In comparison, films of the same untreated resins baked under the more drastic conditions of one hour at 135° C. (which are necessary to "dry" the film to an equal extent), and subsequently exposed to the weather in precisely the same manner, blister after six weeks over the plain steel and after eight weeks over the undercoat. Some rusting of the plain steel also appears after two weeks.

Example III

An alkyd resin is prepared by heating 1108 parts of linseed oil and 226 parts of glycerol (dynamite grade) in the presence of 1 part of litharge for 30 minutes at 225° C. to form linseed oil monoglyceride, adding 528 parts of phthalic anhydride and 94 parts of glycerol (the total glycerol constituting an appreciable excess), and heating until the acid number reaches 1.4, about 5 hours being required. One hundred (100) parts of this excess glycerol alkyd resin is heated to 100° C. and 16 parts of hexamethylene diisocyanate then added. The mixture is stirred at 100° C. for fifteen minutes, after which it is diluted with xylene to 50% solids content. During the heating process, a 50% xylene solution of the resin increases in viscosity from A to B on the Gardner-Holdt scale. The solution of the treated resin is mixed with 0.1% cobalt drier (based on the oil) and is then ready for application as an air-drying or baking finish. The beneficial effect of the diisocyanate treatment is shown in the following table wherein "Resin A" is the same resin but untreated and "Resin B" is a resin of similar oil length (62%) prepared without excess glycerol.

| Resin solution | Condition of film formation | Observations |
|---|---|---|
| Example III | Exposure to air at room temperature. | Tack-free and smooth after 1½ hours. |
| Example III | Air-bake at 100° C. | Hard, tough, and smooth after 1 hour. |
| Resin A | Exposure to air at room temperature. | Very tacky after 5 hours and still somewhat tacky after 2 days. |
| Resin A | Air-bake at 100° C. | Badly wrinkled after 1 hour and not as hard as Example III. |
| Resin B | Exposure to air at room temperature. | Still tacky after 5 hours. |
| Resin B | Air-bake at 100° C. | Badly wrinkled after 1 hour and not as hard as Example III. |

All the above resin solutions are xylene solutions having an equal amount of cobalt drier based on the oil.

Example IV

To 500 parts of a 50% xylene solution of a 50% linseed oil—33% glyceryl phthalate—17% glycol phthalate resin (prepared in conventional manner from appropriately chosen proportions of linseed oil acids, glycerol, glycol, and phthalic anhydride) are added 26 parts of hexamethylene diisocyanate and 6 parts of a 2% solution of cobalt naphthenate in a hydrocarbon solvent (0.1% cobalt based on the oil in the resin). After thorough stirring at room temperature for 10 minutes, the mixture is ready for use as a coating composition. Films baked at 100° C. for one hour are hard, smooth, tough, and fairly water-resistant in that 15 hours' immersion, while producing slight softening, causing no whitening In comparison, films laid down in the same way from the same resin untreated with diisocyanate are wrinkled, cheesy, not nearly so tough, and become very soft and almost opaque on immersion in water for 15 hours.

Example V

To 400 parts of a 55% xylene solution of a 52% linseed oil modified alkyd resin are added 24 parts of hexamethylene diisothiocyanate and 1 part of a 2% solution of cobalt naphthenate in a hydrocarbon solvent (0.02% cobalt based on the oil content of the alkyd resin). After stirring thoroughly at 30° C. for 15 minutes, this mixture is ready for use as a coating composition. Films become tack-free in 10 minutes at 100° C. In comparison films of the untreated resin with an equal amount of drier require 20 minutes.

Example VI

To 100 parts of a 50% solution of a mixed China-wood oil-linseed oil modified alkyd resin of about 50% total oil length is added 5.6 parts of decamethylene diisocyanate. After thorough stirring for a few minutes, the solution is ready for application as a coating composition. Films dry to the tack-free stage in 15 minutes at 100° C. while those of the untreated resin require 45 minutes.

Example VII

To 100 parts of the alkyd resin solution used in Example VI is added 5.6 parts of m-phenylene diisocyanate and 30 parts of xylene. The mixture is warmed with stirring to 50–60° C. to cause the solid diisocyanate to dissolve, after which it is ready for use as a coating. At 100° C., films dry tack-free in 8 minutes. As noted in Example VI, the untreated resin requires 45 minutes to reach this stage.

Example VIII

To 500 parts of a 60% solution of a 50% cottonseed oil modified alkyd resin prepared in the presence of 2% excess glycerol are added 16 parts of hexamethylene diisocyanate and a cobalt drier solution in such amount as to give 0.1% cobalt based on the oil content of the alkyd resin. After thorough mixing at room temperature, the composition is ready for use as a coating composition. Films baked for one hour at 100° C. are hard, smooth, and tough. In comparison, films of the untreated resin containing an equal amount of drier are soft, cheesy, and wrinkled after a similar bake.

Example IX

A coating composition is prepared by mixing thoroughly 500 parts of a 50% toluene solution of a 50% soya bean oil modified alkyd resin and 28 parts of hexamethylene diisocyanate. Films baked at 100° C. for one hour are colorless, smooth, and tack-free. In comparison, films of the untreated resin are still tacky after a similar bake.

Example X

To 100 parts of a 50% solution of a 42% castor oil modified alkyd resin prepared in the presence of 9% excess glycerol (based on total resin ingredients) are added 5.6 parts of hexamethylene diisocyanate and a cobalt drier solution in amount sufficient to give 0.1% cobalt, based on the oil content of the resin. After mixing at room temperature until homogeneous, the composition is ready for use as a coating. Films baked at 100° C. for one hour are completely dry to the touch. In comparison, films of the untreated resin containing the same amount of drier are still very tacky after one hour at 100° C., and do not harden after 16 hours at this temperature.

Example XI

A coating composition is prepared by dissolving 6.7 parts of hexamethylene diisocyanate in 100 parts of a 60% solution of a 40% coconut oil modified alkyd resin prepared in the presence of 2% excess glycerol (based on total resin ingredients). This composition can be used as an air-drying finish by addition of 0.1% cobalt drier, based on the oil content, or it is suitable as a baking finish without drier. Films baked at 100° C. for one hour are clear, colorless, smooth, and tough. In comparison, films of the untreated resin do not dry even upon prolonged baking at 100° C.

Example XII

To 100 parts of a 60% xylene solution of a 50% hydrogenated coconut oil modified glyceryl phthalate resin of acid number 1.4 and hydroxyl number 19.0 (prepared in xylene solution by the method of U. S. 2,057,765) are added 6 parts of hexamethylene diisocyanate and 2 parts of a solution containing 2% cobalt as the naphthenate (0.1% cobalt based on the oil content of the resin). After stirring at 25° C. until the diisocyanate is dissolved, this coating composition is ready for use. Films baked for one hour at 100° C. are dry to the touch, while films of the untreated resin containing the same amount of drier are still very tacky.

Example XIII

To 100 parts of castor oil phthalate (prepared by heating 75 parts of phthalic anhydride and 100 parts of castor oil at 150° C. until the acid number falls to 20) are added 8 parts of hexamethylene diisocyanate and 75 parts of xylene. After stirring until homogeneous, the composition is ready for coating uses. Films baked at 100° C. for one hour are dry, colorless, and flexible. In comparison, untreated castor oil phthalate films do not dry on prolonged baking at 100° C.

Example XIV

To 100 parts of a 50% dry dioxan solution of glyceryl phthalate resin (prepared by heating 370 parts of phthalic anhydride and 152 parts of dynamite glycerol at 200° C. until the acid number falls to 115) is added 5 parts of hexamethylene diisocyanate. After solution of the diisocyanate, the composition is ready for use as a coating. At room temperature, this resin dries in one hour to films which are tougher and more water resistant than films of the untreated resin.

The modified alkyd resins of this invention are also suitable for the production of improved molding compositions. In the part the use of alkyd resins for molding purposes has not been practical due to the fact that conversion of the fusible polymers to the infusible hardened state requires excessively long heating in the mold at impractically high temperatures. Furthermore, the hardening reaction involves the esterification of free hydroxyl and carboxyl groups in the polymer, with elimination of water, and, since this water cannot readily escape from the mold, it causes opacity and weakness in the polymers, and may even tend to reverse the esterification. Through the use of poly —NCX compounds in combination with preformed, fusible alkyd resins, the hardening reaction is greatly accelerated, with the result that it can be carried out in practical molding cycles. Furthermore, the evolution of moisture during the hardening is eliminated. The treatment with poly —NCX compounds also results in markedly improved resistance of the hardened articles to degradation in the presence of water or high humidities. For molding purposes, alkyd resins prepared by condensing polycarboxylic acids such as phthalic acid (or anhydride), 1,4-dihydronaphthalene-1, 4-dicarboxylic acid, adipic acid, and sebacic acid, with polyalcohols such as glycerol, glycol, sorbitol and pentaerythritol, are especially desirable. It is often advantageous to prepare these alkyd resins using an excess of polyhydric alcohol constituent over that required to neutralize or esterify exactly the acidic constituents present. The reaction may be carried to any desired degree of esterification prior to incorporation of the poly —NCX compound, more highly condensed alkyd resins in general requiring lower proportion of the —NCX compound than do less completely esterified alkyds. The resins should, however, preferably be in a fusible condition prior to incorporation of the poly —NCX compounds. The latter compounds may be incorporated in any suitable manner provided the conditions selected do not promote their decomposition or premature reaction with the alkyd resin; thus, incorporation at very high temperatures or in the presence of water or alcohols should be avoided. Suitable conditions for the incorporation include mixing with the molten resin at slightly elevated temperatures, mixing with solutions of the resin followed by evaporation of the solvent, milling with the solid resin, and impregnating the solid powdered resin with the reagent. Molding temperatures and pressures may vary but good results are obtainable in commercial molding presses at temperatures of 100–165° C. and pressures of 500–3000 lbs./sq. in. If desired, suitable fillers, such as wood flour, ground asbestos, ground cork, or pigments may be added. Examples XV and XVI below illustrate the use of poly —NCX compounds in preparing molding compositions.

Example XV

An alkyd resin is prepared by heating 925 parts of phthalic anhydride, 425 parts of glycerol, and 100 parts of ethylene glycol until the acid number is about 40; the resin is then nearly at the point of gelation. This resin is cooled and pulverized to pass through a 100-mesh screen. To 100 parts of the pulverized resin is added 11 parts of tetramethylene diisocyanate and the composition thoroughly mixed. Upon being molded at 165° C. for 10 minutes, transparent, homogeneous, well-molded objects are formed. Whereas the similarly molded unmodified resin is so very brittle that it tends to break on being removed from the mold, the molded modified resin is quite resistant towards breakage. Furthermore, the modified resin is practically unaffected by treatment with water, while the unmodified resin is softened and becomes opaque when submerged under water. The modified resin also has a higher softening temperature than the unmodified material.

Results similar to those of the above example are obtained if the tetramethylene diisocyanate is replaced by ethylene diisocyanate or m-phenylene diisocyanate. Articles molded from these modified resins soften at temperatures some 12–15° C. higher than articles similarly molded from the unmodified resin.

*Example XVI*

An alkyd resin is prepared by heating 90 parts of pentaerythritol and 147 parts of phthalic anhydride until the mixture gels (acid number about 118). Attempts to obtain useful molded articles from this resin are unsuccessful because of extreme brittleness. The pulverized resin (94 parts) and 9.3 parts of hexamethylene diisocyanate are thoroughly mixed, and the mixture placed in a heated mold at 160° C. and molded for 10 minutes at this temperature. The resulting article is much tougher than that similarly made from the unmodified resin. Furthermore, it is not appreciably affected by water, whereas the unmodified resin becomes opaque and soft.

The beneficial effects of the herein described treatment with poly —NCX compounds are obtained to a greater or less extent with any kind of alkyd resin whatsoever, regardless of the nature and number of polycarboxylic acids and polyhydric alcohols used to make it, and regardless of the presence or absence of monofunctional modifiers, and, if present, their nature. Thus the treatment can be successfully applied to alkyd resins manufactured from such polycarboxylic acids as phthalic, isophthalic, terephthalic, succinic adipic, sebacic, maleic, fumaric, 2-phenylglutaric, acetylenedicarboxylic, itaconic, malic, citric, camphoric, and diphenic acids or anhydrides thereof; and from such polyhydric alcohols as ethylene glycol, hexamethylene glycol, pinacol, diethylene glycol, glycerol, 1,1,1-trimethylolpropane, castor oil, erythritol, pentaerythritol, triethanolamine, and mannitol. These resins can optionally be modified with such monocarboxylic acids as butyric acid, lauric acid, stearic acid, acrylic acid, oleic acid, ricinoleic acid, glycolic acid, lactic acid, chloroacetic acid, benzoic acid, salicyclic acid, abietic acid (rosin), cottonseed oil acids, linseed oil acids, soya bean oil acids, and China-wood oil acids; and/or with such monohydric alcohols as methyl, butyl, allyl, benzyl, n-dodecyl, linoleyl, and cyclohexyl alcohols; and/or with any other known type of alkyd resin modifying agents, e. g., mono- and polyamines, including amino acids and amino alcohols. Suitable resins can be made from any mixture of these ingredients provided, of course, that the mixture always comprises in resinifying proportions at least one polycarboxylic acid and at least one polyhydric alcohol. These ingredients can be combined by any of the methods known in the art, but to be most useful in preparing coating composition vehicles, the resin should not have been carried in its preparation to the point where it is no longer soluble in some organic solvent. For example, suitable alkyd resins can be prepared by any of the following methods: (1) fusion of a mixture of a polyhydric alcohol and polycarboxylic acid, (2) fusion of a polyhydric alcohol, polycarboxylic acid, and fatty oil acid, (3) fusion of a fatty oil (a triglyceride) with glycerol to form the mono- or diglyceride, followed by fusion with a polycarboxylic acid, or (4) the solution method described in U. S. 2,057,765.

In addition to the hardening accelerators given in the examples, many other poly —NCX compounds can be used, among them methylene diisothiocyanate, ethylene diisocyanate, 1,4-dicyanatocyclohexane

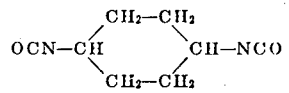

p-isocyanatobenzyl isocyanate

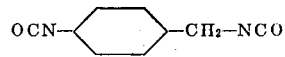

p-phenylene diisothiocyanate, 2,3-dimethyltetramethylene diisocyanate, 1,2,3,4-tetraisocyanatobutane, p,p'-diphenylene diisothiocyanate, 2-chlorotrimethylene diisocyanate, 6-isocyanato-3-hexenyl isocyanate, 5-nitro-1,3-phenylene diisocyanate, 3,5-diisothiocyanatopentyl isocyanate, m-isocyanatocinnamyl isocyanate.

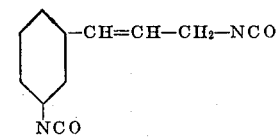

bis-2-isocyanatoethyl ether

OCN—CH₂—CH₂—O—CH₂—CH₂—NCO or the corresponding sulfide, and 1,5-diisocyanato-3-pentanone

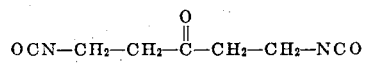

In other words, in the process of this invention, the alkyd resin can be beneficially treated with any organic compound having a plurality of groups of the formula —N=C=X, X being oxygen or sulfur, i. e., with any polyisocyanate, any polyisothiocyanate, or any isocyanate-isothiocyanate. The poly —NCX compound may be aliphatic or aromatic; acyclic or cyclic and if the latter monocyclic, polycyclic, homocyclic, or heterocyclic; saturated or unsaturated; and substituted or not by other groups, such as ether, sulfide, ketone, ester, halogen, nitro, and the like. The polyisocyanates, because of their greater reactivity, are preferred to polyisothiocyanates, and of the polyisocyanates the aliphatic type (i. e., those in which the —NCX groups are attached to aliphatic carbons) are more generally useful because of their greater stability.

In regard to the amount of the poly —NCX compound, any quantity can be used ranging from mere traces up to very large amounts. In general, for a given resin, the effect on hardening rate and general resin properties will be proportional to the quantity of poly —NCX compound, but only up to a certain point, beyond which an excess, while it usually does no harm, has no particular effect. This optimum point seems to be a complex of many factors and is best determined for each resin by simple trial. A few rough guiding generalizations, however, can be stated. With all alkyd resins, the optimum amount of modifier, roughly speaking, varies inversely with the degree of esterification and directly with the amount of excess polyhydric alcohol. In the case of fatty oil modified alkyd resins, the optimum, roughly speaking, varies directly with the amount of oil and inversely with the drying ability of the oil; that is, the drying oil modified alkyds require less than the non-drying oil modified types. Thus, the rate of hardening of drying oil modified alkyd resins of acid number about 50 or less is markedly accelerated by only about 2-5% of poly —NCX compound. Non-drying oil modified alkyds often require larger amounts, i. e., 5-25%, the best amount in this range depending, as above indicated, upon the nature and amount of the oil, the amount of excess polyhydric alcohol, and the degree of resinification. Unmodified alkyd resins require 1-25%, the optimum in any given case again depending on the valency (i. e., number of OH groups) and amount of the polyhydric alcohol and on the degree of resinification.

In the treatment of the alkyd resin with the poly —NCX compound, it is necessary that the resin, the solvents, and the conditions be substantially anhydrous in order that the modifier will not be destroyed by hydrolysis. No special precautions, however, need as rule be taken since common alkyd resin solutions and ordinary plant or laboratory conditions are usually sufficiently anhydrous. The solvent used may be any solvent which dissolves the resin and is chemically inert to the poly —NCX compound under the conditions of treatment, suitable solvents being xylene, benzene, toluene, dioxan, and high boiling aliphatic, aromatic, or naphthenic hydrocarbons. As for the actual treatment, it is usually satisfactory merely to add the modifier to the resin solution and stir at room temperature until dissolved, after which the solution is ready for application as a coating composition by any conventional method, such as brushing or spraying. There are some alkyd resins, however, which are benefitted by a heat-treatment with the poly —NCX compound prior to the application as a coating, this treatment being desirably conducted in the presence of a solvent, conveniently that in which the resin is dissolved prior to addition of the modifier. The use of solvent with diisocyanate modified alkyd resin is not an essential part of this invention, but solvvents will generally be employed when the compositions are to be used in coatings or impregnants. The optimum time and temperature of the heat treatment en masse (as opposed to films), in addition to requiring proper regulation in order to obtain a product of acceptable body, will vary with the type of resin used (i. e., the valency and proportions of polyhydric alcohol and the nature and amount of any modifying agents, e. g., fatty oils, which are present), the nature and proportion of poly —NCX compound used, and the proximity of the resin to the gel point. Thus, oil modified alkyd resins prepared just short of the gel point require no initial heating with the modifier, while these same resins prepared in a lower state of condensation often can advantageously be heated with the modifier from 5 minutes to 2 hours at 50-150° C. Certain alkyd resins alone do not gel even on prolonged heating, and such resins require a much more severe treatment; for example, a condensation product of ethylene glycol and phthalic anhydride can advantageously be heated with the modifier for 10-30 hours at 150° C. If the poly —NCX compound is a polyisothiocyanate, more drastic heating than is required for polyisocyanates is generally desirable. Also, more prolonged heat treatment is generally used with larger amounts of the poly —NCX compound.

The beneficial effect of the poly —NCX compound will in general be realized to some extent by air-drying at ordinary temperatures, but the extent of the improvement will vary considerably with the type of resin. Thus, in certain cases, e. g., drying oil modified alkyds of moderate or short oil length and of low acid number, the improvement is more pronounced. Indeed, in these and similar instances, the reactivity of the poly —NCX compound with the resin in solution may be such as to cause increases in viscosity and even gelation on storage, in which cases the modifier should be dissolved in the resin solution shortly before it is to be used as a coating composition.

While the application of the film at room temperature to the object or surface to be coated is a part of the invention, it will generally be found that the maximum effect of the poly —NCX compound is obtained or developed by subjecting the film, after application, to a mild baking treatment, e. g., at 80-125° C. for 15 minutes to 2 hours, the time of course varying inversely with the temperature. It is to be noted that this baking of the film is distinct from (though it may supplement) the previously mentioned heat-treatment en masse, which has its limitations because of the tendency of the resin solution to body, even to the point of gelation, and the attendant difficulty or impossibility of laying down films. It is also to be noted that the baking treatment is relatively mild; i. e., it need not be carried out at a high temperature. Indeed, one of the advantages of the compositions of this invention is their ability to set up rapidly on baking at much lower temperatures than would normally be used.

A further modification of this invention is that it is possible to prepare untreated alkyd resin films and to treat them, after a brief hardening, with diisocyanates or diisothiocyanates. In carrying out this modification, a clear or enamel based on an alkyd resin is brushed or sprayed on the substrate and partially hardened by a brief air-drying or baking period. The modifier is next applied to the surface of the film, which is then air-dried or baked to the desired state of hardness. Films treated in this way are also characterized by having improved surface hardness, resistance to water, and durability on outdoor exposure. This is one variation of the invention in which the resin, at the time of treatment, is usually no longer soluble.

A still further variation of the invention is the treatment of the alkyd resin in a partially formed stage; i. e., the resin ingredients may be heated together until homogeneous and until the acid number shows that esterification has proceeded 60% or better of the theoretical, after which the resin can be dissolved in a solvent and treated with the poly —NCX compound. In these instances, large amounts of the latter can be used and are usually desirable.

As disclosed and claimed in my copending application Serial No. 363,927, filed November 1, 1940, small proportions of soluble metallic driers, such as cobalt, manganese, and lead naphthenates and linoleates, while not an essential constituent of the products of the invention, enhance the effect of the poly —NCX modifiers in accelerating the drying and hardening of alkyd resin films, suitable amounts being 0.01–1.0% of the metal, based on the weight of the resin, or, if it contains about 35% or more of a drying oil, on its oil content. Surprisingly, however, this beneficial effect of metallic driers is not confined to the drying oil modified alkyds (i. e., it is observed with all other types as well) though it is perhaps more pronounced when the resin contains a drying oil. Small amounts of oxygen-yielding catalysts also enhance the effect of the poly —NCX compound on the drying of fatty oil modified alkyd resin films, suitable amounts being 0.01–5.0% based on the oil content of the resin. Examples of this type of catalyst are peroxides such as benzoyl peroxide, acetone peroxide, pinene peroxide, and ascaridole, and oxygen-carriers such as pinene and tetralin. These catalysts can be used in combination with the metallic driers if desired.

The products of this invention are useful as vehicles for improved air-drying or baking coating, impregnating, or adhesive compositions and also as molding compositions. For these uses, they can be formulated with pigments, metallic driers, dyes, fillers, waxes, inhibitors, plasticizers, and thinners by any of the methods known in the art. Useful coating compositions can also be made from these treated alkyd resins in combination with other film-forming materials such as, for example, drying oils, drying oil varnishes, cellulose acetate, cellulose nitrate, chlorinated rubber, and soluble phenol-formaldehyde or urea-formaldehyde resins, in which instances it is sometimes preferable to mix the alkyd resin with the other film-forming material, add the poly —NCX compound, and follow with a heat treatment if desired. The products of the present invention, with or without the above-noted auxiliary film-forming and other materials, can be used to coat metal or wood directly or over a suitable base coat, and they can also be used over glass, leather, stone, cloth, paper, rubber, or cellulose. The form of the substrate is immaterial; thus it can be a molded object. As described above, the products of this invention are useful for molding into any desired form. In addition, they can be prepared in the shape of unsupported films or sheeting. The latter can be employed for a variety of purposes, such as for safety glass interlayers, wrapping foil, and the like.

Certain types of alkyd resins are especially valuable as vehicles for coating compositions by virtue of their ease of application and good appearance, and durability of the final film. These alkyd resins, the use of which is preferred in the present invention, contain from about 35–65% fatty oil (e. g. China-wood oil, castor oil, cottonseed oil, linseed oil, and soya bean oil) and 65–35% polyhydric alcohol-polycarboxylic acid ester, especially glyceryl phthalate. It is frequently of advantage to incorporate into the resin a low proportion (e. g., 1–5%, based on the total resin ingredients) of excess polyhydric alcohol, especially glycerol. When this is done, the treatment with the poly —NCX compound yields a product which dries faster than that obtained by treating the balanced formula resin with the poly —NCX compound.

The actual treatment of the above select types of resin is best carried out at a temperature of about 20–100° C. and with about 2–10%, based on the weight of the resin, of an aliphatic diisocyanate, particularly a polymethylene diisocyanate. The films obtained can be hardened, by air-drying or baking, more rapidly than films obtained by treating other types of resins with other types of poly —NCX compounds under other conditions, though it is understood of course that improvements are nevertheless obtained in the latter instances. A particularly preferred specific embodiment of the present invention is the treatment of 35–65% drying oil modified glyceryl phthalate resins at 20–50° C. with 2–10% of a polymethylene diisocyanate, and especially with 2–5% of hexamethylene diisocyanate in the presence of 0.1% cobalt, based on the oil. In the case of non-drying oil modified alkyd resins, the effect of the treatment with the poly —NCX compound is most beneficial when the resin has an oil length of 25–50% and is prepared in the presence of 2–5% excess glycerol, based on the total resin ingredients.

The above description and examples are intended to be illustrative only. Any modification of or variation therefrom which conforms to the spirit of the invention is intended to be included within the scope of the claims.

What is claimed is:

1. A composition comprising essentially an alkyd resin and an organic compound having a plurality of groups of the formula —NCX, where X is an element of group VI of the periodic table and has an atomic weight less than 33.

2. A liquid coating composition in which the binder comprises in effective amount a blend of a soluble alkyd resin and an organic compound having a plurality of groups of the formula —NCX, where X is an element of group VI of the periodic table and has an atomic weight less than 33.

3. A coating composition comprising pigment, solvent, soluble alkyd resin, and an organic compound having a plurality of groups of the formula —NCX, where X is an element of group VI of the periodic table and has an atomic weight less than 33.

4. An article of manufacture having, as a coating or impregnant, a reaction product of an alkyd resin and a compound having a plurality of groups of the formula —NCX, where X is an element of group VI of the periodic table and has an atomic weight less than 33.

5. A molded object comprising the reaction product of an alkyd resin and an organic compound having a plurality of groups of the formula —NCX, where X is an element of group VI of the periodic table and has an atomic weight less than 33.

6. An alkyd resin containing in chemical combination the reaction residue of an organic compound having a plurality of groups of the formula —NCX, where X is an element of group VI of the periodic table and has an atomic weight less than 33.

7. The composition set forth in claim 1 in which the poly —NCX compound is a diisocyanate.

8. The composition set forth in claim 1 in which the poly —NCX compound is an aliphatic diisocyanate.

9. The composition set forth in claim 1 in which the poly —NCX compound is an aliphatic diisocyanate and the resin is a fatty oil modified alkyd resin.

10. The composition set forth in claim 1 in which the poly —NCX compound is an aliphatic diisocyanate and the resin is a drying oil modified alkyd resin.

11. The article set forth in claim 4 in which the coating or impregnant is an alkyd resin-aliphatic diisocyanate reaction product.

12. The article set forth in claim 4 in which the coating or impregnant is a drying oil modified alkyd resin-aliphatic diisocyanate reaction product.

13. Process which comprises treating an alkyd resin with a compound having a plurality of groups of the formula —NCX, where X is an element of group VI of the periodic table and has an atomic weight less than 33.

14. Process according to claim 13 in which the initial alkyd resin is soluble and the treatment is accompanied or followed by heating at a temperature and for a time insufficient to cause gelation of the resin.

15. Process according to claim 13 in which the resin is a fatty oil modified alkyd resin and the poly —NCX compound is a polyisocyanate.

16. Process according to claim 13 in which the resin is a 35–65% fatty oil modified alkyd resin and the poly —NCX compound is an aliphatic diisocyanate and is used in an amount of 2–10% based on the weight of the resin.

17. A composition comprising essentially an alkyd resin and hexamethylene diisocyanate.

18. A liquid coating composition in which the binder comprises in effective amount a blend of a soluble alkyd resin and hexamethylene diisocyanate.

19. A coating composition comprising pigment, solvent, soluble alkyd resin and hexamethylene diisocyanate.

20. A molded object comprising the reaction product of an alkyd resin and hexamethylene diisocyanate.

21. An alkyd resin containing in chemical combination the reaction residue of hexamethylene diisocyanate.

22. A liquid coating composition in which the binder comprises in effective amount a blend of a soluble drying oil modified alkyd resin and hexamethylene diisocyanate.

HENRY S. ROTHROCK.